United States Patent [19]

Kervagoret

[11] 4,244,390

[45] Jan. 13, 1981

[54] HYDRAULIC CIRCUIT BREAKER

[75] Inventor: Gilbert Kervagoret, Arbenteuil, France

[73] Assignee: Societe Anonyme DBA, Paris, France

[21] Appl. No.: 56,484

[22] Filed: Jul. 11, 1979

[51] Int. Cl.[3] .................... G05D 11/03; G05D 16/10

[52] U.S. Cl. .................................. 137/118; 137/115; 60/418

[58] Field of Search ..................... 137/15, 118; 60/418

[56] References Cited

U.S. PATENT DOCUMENTS

| | | | |
|---|---|---|---|
| 3,393,945 | 7/1968 | Reichard | 137/118 X |
| 3,915,186 | 10/1975 | Thomas | 60/418 X |
| 4,016,895 | 4/1977 | Budecker | 137/118 X |
| 4,073,140 | 2/1978 | Lang | 137/118 X |
| 4,131,125 | 12/1978 | Tanguy | 137/118 |
| 4,199,941 | 4/1980 | Farr | 60/418 X |

*Primary Examiner*—William R. Cline
*Attorney, Agent, or Firm*—Paul David Schoenle; Ken C. Decker

[57] ABSTRACT

A hydraulic circuit breaker comprising an inlet chamber supplied with pressurized fluid from a pump and connected to a hydraulic circuit of the open-center type through a variable constriction, to a control chamber via a passage of reduced cross-section provided in a differential piston which separates both chambers from each other, and to a hydraulic accumulator through a check-valve, and further comprising a variable-volume vessel in communication with the control chamber and comprising a valve element responsive to the pressure reigning in said chamber for opening or closing a leak passage of restricted cross-section intended to allow the vessel to be discharged. In order to simplify the manufacture of the device and make easier its possible adjustment, the present invention proposes to realize the variable-volume vessel as an interchangeable capsule which is received in the proper control chamber and additionally serves as an abutment for limiting the stroke of the differential piston. This device is intended mainly for use in automotive vehicles having both power-assisted brakes and power-assisted steering.

5 Claims, 1 Drawing Figure

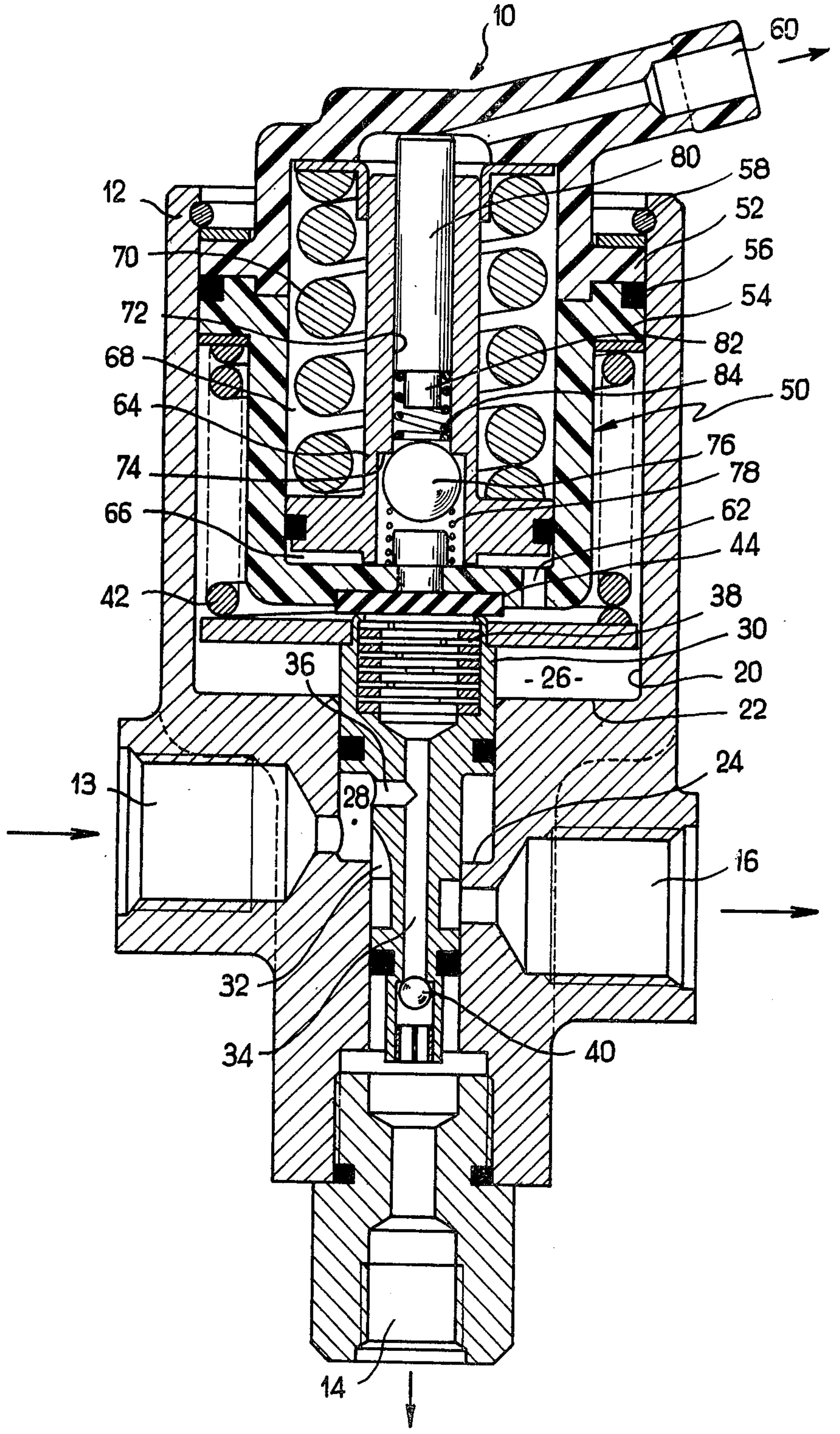
10
60
80
58
12
52
70
56
72
54
82
68
84
64
50
76
74
78
66
62
44
42
38
30
36
-26-
20
22
24
13
28
16
32
34
40
14

HYDRAULIC CIRCUIT BREAKER

In a copending U.S. patent application assigned to the same Assignee as the present one, has been described a hydraulic circuit breaker usable more particularly for loading an accumulator with pressure fluid from a hydraulic pump.

More specifically, the above Application relates to a hydraulic circuit breaker comprising a housing having an inlet orifice for connecting to the outlet of a hydraulic pump, a first outlet orifice for connecting to the pressure chamber of a hydraulic accumulator, and a second outlet orifice for connecting to an open-centre hydraulic circuit, a stepped bore formed in the housing receiving a differential piston which defines an inlet chamber therein in communication with the inlet orifice and a control chamber, a constriction orifice having a cross-section which varies in dependence on the position of the differential piston being disposed between the inlet chamber and the second outlet orifice, the inlet chamber communicating with the control chamber via a first passage comprising a first constriction and also communicating with the first outlet orifice via a connection comprising a non-return valve, the circuit breaker also comprising a resilient vessel having a variable-volume compartment connected to the control chamber, this vessel being adapted to connect the compartment with a second or leak passage forming a constriction when the pressure in the compartment reaches a first predetermined value, and the communication with the leak passage being interrupted when the pressure in the compartment falls below a second predetermined value.

The resilient vessel in the hydraulic circuit breaker is adapted to spread over time any pressure variations occuring during transient increases or decreases in the pump pressure during the loading of the accumulator.

In a preferred embodiment described in the copending Application referred to above, the resilient vessel comprises a second bore formed parallel to the stepped bore in the circuit breaker housing and containing a second piston which divides it into a first or variable-volume compartment and a second compartment, the second piston being urged by resilient means and being provided with an axial passage for connecting the two compartments under the control of a resilient valve which a stationary or push-rod element automatically raises when the second piston has moved a distance corresponding to the first predetermined pressure in the compartment, i.e. in the control chamber.

This device, though operating satisfactorily, has a disadvantage in that the second bore has to be machined in the circuit breaker housing, which must be given the appropriate volume. In addition, any modification in the operating characteristics of the resilient vessel, e.g. any adjustment of the force of the resilient means acting on the second piston, will cause the mechanism to be dismantled, which may be difficult and time-consuming or even impossible when the circuit breaker is installed in a motor vehicle.

An object of the present invention is to obviate these disadvantages by reducing the number of machine operations required, to improve the compactness of the hydraulic circuit breaker, and to make the resilient vessel more easily accessible if its operating characteristics have to be adjusted.

To this end, according to the invention, the resilient vessel is composed of an interchangeable capsule placed coaxially in the large-diameter or control-chamber portion of the stepped bore, this capsule containing the second piston slidably mounted therein in sealing-tight manner and dividing its interior into a first or variable-volume compartment and a second compartment, said second piston being urged towards the end of the first compartment by resilient means disposed in the second compartment, an axial passage for connecting the two compartments being provided in the piston and opening into the first compartment to define a valve seat which co-operates with a valve element resiliently urged there against, a push-rod element which is stationary relative to the capsule being disposed in said axial passage of the second piston and adapted to raise the valve element from its seat so that fluid can flow in the leak passage when the second piston has moved a given distance corresponding to the first predetermined pressure in said first compartment, the leak passage then comprising the space defined between the push-rod element and the axial passage, and the second compartment being connected by a leak orifice to a low-pressure fluid tank.

Thus, the resilient vessel is contained in a capsule which takes the place previously occupied by a passive abutment, i.e. without requiring any additional machining of the circuit breaker housing but reducing its total bulk. The vessel is interchangeable and can therefore easily be extracted and if required, replaced by another resilient vessel having different characteristics.

The invention will now be described with reference to a preferred embodiment, given by way of example only, with reference to the single accompanying drawing, which is a view in section of a hydraulic circuit breaker according to the invention.

Referring to the drawing, the hydraulic circuit breaker 10 according to the present invention comprises a housing 12 formed with an inlet orifice 13, a first outlet orifice 14 and a second outlet orifice 16. The inlet orifice 13 is for connecting to a hydraulic pump having a substantially constant volumetric flow. The first outlet orifice 14 is for connecting to the pressure chamber of a pressure fluid accumulator (not shown) which in turn provides pressure fluid to an auxiliary circuit of the closed-centre kind, e.g. a hydraulic brake booster. The second outlet orifice is connected to an open-centre auxiliary circuit such as a power steering valve (also omitted from the drawing).

The housing 12 has a stepped bore 20 comprising three different-diameter portions separated by two shoulders 22 and 24. The large-diameter portion of bore 20 defines a control chamber 26, whereas the smaller-diameter portion opens on to the first outlet orifice 14. The medium-diameter portion of bore 20 co-operates with a differential piston 30 slidingly received in the bore to form an inlet chamber 28 communicating with the inlet orifice 13. Piston 30 has a large-diameter portion which projects into the control chamber 26, and a small-diameter portion which slides in the smaller-diameter portion of bore 20 and the end of which is subjected to the pressure in the first outlet orifice 14. Piston 30 has one or more longitudinal grooves 32 adapted to connect the inlet chamber 28 with the second outlet orifice 16. The depth of the grooves increases with distance from the shoulder of differential piston 30. The grooves co-operate with shoulder 24 to form a constriction orifice in the path of fluid between the inlet orifice 13 and the second outlet orifice 16, the constriction orifice having a cross-section which varies with the position of piston 30. Piston 30 also has an axial passage 34 connected to the inlet chamber 28 by a radial passage 36. Passage 34 communicates with control chamber 26 via a constriction 38 which, in the example shown, is a stack of crimped, perforated pellets. Passages 34 and 36 interconnect the inlet chamber 28 and the first outlet orifice 14, which is controlled by a check valve 40, i.e. a ball in the example illustrated. A spring 42 in chamber 26 resiliently urges piston 30 against the pressure in chamber 28, and also against the pressure of a fluid accumulator connected to outlet 14. The extent to which the differential piston 30 enters the control chamber 26 is limited by an abutment which, as shown hereinafter, is the proper resilient vessel of the circuit breaker. Preferably, the abutment bears on piston 30 via an elastomeric washer 44 which, when piston 30 is in the abutting position, disconnects the axial passage 34 from the control chamber 26.

According to the invention, the resilient vessel (generally referenced as 50) in circuit breaker 10 is in the form of an interchangeable capsule coaxially disposed in the large-diameter portion of bore 20 bounding the control chamber 26. The capsule is made up of two fitted-together parts 52 and 54, preferably of plastics, clamped against one another with interposition of a seal 56 by being compressed by spring 42 which presses the assembly against a removable resilient snap-ring 58. The top part 52 is formed with a discharge orifice 60, via which it can be connected to a sink of low-pressure fluid, e.g. the tank of the hydraulic system. The bottom part 54 has a passage 62 which connects the interior of the capsule to the control chamber 26.

The capsule formed by the joined-together parts 52, 54 contains a piston 64 sliding in sealing-tight manner and dividing the interior of the capsule into a first compartment 66, which is connected by passage 62 to the control chamber 26, and a second compartment 68, which is connected to the discharge orifice 60. When inoperative, piston 64 is urged against the end of compartment 66 by a spring 70 disposed inside compartment 68 and coaxially surrounding the piston.

Piston 64 has an axial passage 72 adapted to connect compartments 66 and 68. The passage opens into compartment 66 and defines a valve seat 74 which co-operates with a valve member 76 (a ball in the present case) resiliently urged against the seat by a light spring 78. The axial passage 72 contains a push-rod 80 which is stationary with respect to the capsule, and which terminates in a finger 82. In the inoperative position shown in the drawing, in which piston 64 is pressed to the maximum extent towards compartment 66 by spring 70, the end of finger 82 is retracted with respect to the plane containing the valve seat 74, and ball 76 is held against this seat by the associated spring 78. A spring 84 disposed in passage 72 and surrounding the finger 82, is longer than the finger but insufficiently long to normally urge ball 76. Between the push-rod 80 and the bore defining passage 72, there is a limited radial clearance enabling the fluid to travel between the first compartment 66 and the second compartment 68 when valve 76 is moved from its seat 74.

The aforementioned hydraulic circuit breaker operates as follows:

In the inoperative position shown in the drawing, the accumulator is connected to the first outlet orifice 14 and is assumed to be loaded. The pressure in the accumulator keeps valve 40 closed and urges differential piston 30 upwards, thus allowing a normal flow of fluid between the inlet orifice 13 and the outlet orifice 16, i.e. between the hydraulic pump and the power steering valve. The resilient vessel is in the position shown in the drawing and valve 76 is held pressed against its seat 74 by spring 78.

If the pressure in the fluid accumulator falls below the switching pressure, i.e. the minimum operating pressure, the differential piston is pushed back by spring 42 and reduces the flow cross-section between chamber 28 and orifice 16. This results in a pressure increase in chamber 28, and consequently in a flow of fluid from chamber 28 to chamber 26 via constriction 38. This results in progressive charging of vessel 50 via passage 62. The increase in pressure in chamber 26 is added to the action of spring 42, and the process continues progressively until the pressure delivered by the pump reaches the switching value. The valve 40 is then raised from its seat and some of the fluid delivered by the pump is sent to the accumulator, which begins to reload. From this time, the pump pressure continues to increase but more slowly.

Inside vessel 50, the pressure increase occurring in chamber 26 is communicated to compartment 66 and consequently moves piston 64 upwards. During a first stage of its motion, valve 76 accompanies piston 64 and engages the free end of spring 84 which it compresses. This first stage ends when valve 76 engages the end face of finger 82.

At the beginning of the second stage, a slight further movement of piston 64 has the effect of raising ball 76 from valve seat 74, thus equalizing the pressure on either side of the ball, so that spring 84 can now expand and move the ball right away from its seat. The force of spring 70 and the length of push rod 80, 82 can be chosen so that the valve or ball 76 opens when piston 64 moves in response to a predetermined pressure value in compartment 66 and hence in chamber 26. This predetermined pressure will be called the 'opening presure'. It is proportional to the pressure in chamber 28. Consequently, the valve or ball 76 can be opened when the pressure in chamber 28 reaches the value corresponding to the 'break' pressure of the accumulator, i.e. the maximum pressure to which it may be reloaded.

In other words, the valve of the resilient vessel opens at the instant when the associated accumulator is properly loaded.

As soon as the valve opens, a laminar flow of fluid towards orifice 60 occurs via the leak passage defined between push rod 80 and the bore in piston 64. This results in a progressive reduction in pressure in compartment 66 and chamber 26. Next, piston 30 moves back against the action of spring 42, thus increasing the cross-section of the constriction between chamber 28 and orifice 16, thus progressively reducing the pressure in chamber 28. Inside vessel 50, the pressure drop in compartment 66 causes piston 64 progressively to return to its inoperative position under the action of spring 70. Since spring 84 is longer than finger 82 of push rod 80, the valve or ball 76 remains open until piston 64 has withdrawn a distance sufficient for the ball to engage seat 74 again. Thereupon the valve closes again, so that no fluid can flow between compartments 66 and 68. The length of spring 84 is made such that the flow of fluid between the two compartments is reduced when the pressure in compartment 66 has decreased by a given quantity $\Delta P$ in order to reach the 'closing' value. The closing value is set so that the pressure in chamber 28 becomes less than the pressure in chamber 26 as soon as ball 76 is again in contact with seat 74. It is necessary for the closing pressure to be below the switch-to-break range of the accumulator.

The third stage of operation begins at the instant when the valve of the resilient vessel has closed again. The hydraulic fluid then flows from compartment 66 and chamber 26 to the pump, via the constriction 38 in the axial passage 34, and via the radial passage 36 and the inlet chamber 28 until the vessel is completely depressurized.

As the preceding description shows, the operating characteristics of the vessel 50, and consequently of the hydraulic circuit breaker 10 of which it forms a part, are closely dependent on a certain number of design parameters, inter alia the strength of spring 70, the relative lengths of push rod 80, 82 and piston 64, the length of spring 84, etc. Accordingly, these various design parameters can be altered in order to modify the characteristics of the hydraulic circuit breaker. This operation is greatly facilitated by the design of the resilient vessel 50 according to the invention, since it is only necessary to extract the locking ring 58 in order to withdraw the capsule or resilient vessel in one piece and replace it by another capsule having the desired characteristics. The operation takes only a little time and does not necessitate dismantling the hydraulic circuit breaker or removing it from the vehicle on which it is installed.

What I claim is:

1. A hydraulic circuit breaker comprising a housing having an inlet orifice for connecting to the outlet of a hydraulic pump, a first outlet orifice for connecting to the pressure chamber of a hydraulic accumulator, and a second outlet orifice for connecting to an open-centre hydraulic circuit, a stepped bore formed in the housing receiving a differential piston which defines an inlet chamber therein in communication with the inlet orifice and a control chamber, a constriction orifice having a cross-section which varies in dependence on the position of the differential piston being disposed between the inlet chamber and the second outlet orifice, the inlet chamber communicating with the control chamber via a first passage comprising a first constriction and also communicating with the second outlet orifice via a connection comprising a check valve, the circuit breaker also comprising a resilient vessel having a variable-volume compartment connected to the control chamber, said vessel being adapted to connect the compartment with a second or leak passage forming a constriction when the pressure in the compartment reaches a first predetermined value, and the communication with the leak passage being interrupted when the pressure in the compartment falls below a second predetermined value, said resilient vessel comprising an interchangeable capsule placed coaxially in the large-diameter or control-chamber portion of the stepped bore, said capsule containing a second piston slidably mounted therein in sealing-tight manner and dividing its interior into a first or variable-volume compartment and a second compartment, said second piston being urged towards the end of said first compartment by resilient means disposed in said second compartment, an axial passage for connecting the two compartments being provided in said piston and opening into the first compartment to define a valve seat which co-operates with a valve element resiliently urged thereagainst, a push rod element stationary relative to the capsule being disposed in said axial passage of the second piston and adapted to raise said valve element from its seat so that fluid can flow in the leak passage when the second piston has moved a given distance corresponding to said first predetermined pressure in said first compartment, the leak passage then comprising the space defined between said push-rod element and said axial passage, and said second compartment being connected by a leak orifice to a low-pressure fluid tank.

2. A hydraulic circuit breaker according to claim 1, wherein a spring is mounted in the axial passage in the second piston between the push rod element and the valve element in order to move the valve from its seat after it has been raised, and to hold the valve in its open position until said second piston has returned a certain distance, as a result of a given pressure drop in the first compartment.

3. A hydraulic circuit breaker according to claim 1, wherein the capsule constituting the resilient vessel is dimensioned so as to act as an abutment limiting the extent to which the differential piston penetrates into the control chamber.

4. A hydraulic circuit breaker according to claim 3, wherein the abutment surface offered by said capsule to the differential piston is lined with a sealing-tight washer adapted to disconnect the inlet chamber from the control chamber.

5. A hydraulic circuit breaker according to claim 1, wherein the capsule comprises two joined-together parts, preferably of plastics, one having an orifice for connecting the variable-volume compartment to the control chamber and the other having a discharge orifice for connecting to the low-pressure fluid tank.

* * * * *